United States Patent [19]

Commander et al.

[11] 4,115,823
[45] Sep. 19, 1978

[54] TRACK FOLLOWING SERVOSYSTEM FOR DATA STORAGE APPARATUS

[75] Inventors: Robert Duncan Commander, Eastleigh; Peter Alan Edward Gardner, Southampton; John Richard Taylor, Winchester, all of England

[73] Assignee: International Business Machines Corporation, Armonk, N.Y.

[21] Appl. No.: 810,328

[22] Filed: Jun. 27, 1977

[30] Foreign Application Priority Data

Dec. 22, 1976 [GB] United Kingdom ............... 53582/76

[51] Int. Cl.² ..................... G11B 21/10; G11B 17/00; G11B 5/82
[52] U.S. Cl. ......................................... 360/77; 360/78
[58] Field of Search ................... 360/77, 78, 75, 133, 360/135

[56] References Cited

U.S. PATENT DOCUMENTS

| | | | |
|---|---|---|---|
| 3,534,344 | 10/1970 | Santana | 360/77 |
| 3,742,470 | 6/1973 | Ha et al. | 360/77 |
| 3,812,533 | 5/1974 | Kimura et al. | 360/77 |
| 3,893,180 | 1/1975 | Braun et al. | 360/77 |
| 4,032,984 | 6/1977 | Kaser et al. | 360/77 |
| 4,068,269 | 1/1978 | Commander et al. | 360/78 |

FOREIGN PATENT DOCUMENTS 2,364,784  3/1975  Fed. Rep. of Germany ............. 360/77

*Primary Examiner*—Alfred H. Eddleman
*Attorney, Agent, or Firm*—Nathan N. Kallman

[57] ABSTRACT

A data storage apparatus, such as an accessing head magnetic disk file, includes at least one data disk surface and a servo disk surface. In operation, a continuous position signal having high frequency components is derived from the servo surface, which has a quadature type servo signal prerecorded thereon. A circuit means modifies the derived position signal so that a substantially linear signal representing the displacement of the servo head from the servo track is obtained. A second position signal having a low frequency component is obtained from servo sector information registered on the data disk surface and together with the first position signal forms a hybrid position signal. This hybrid signal is used to control the movement of the data heads relative to the data tracks to ensure optimum transducing operation.

9 Claims, 4 Drawing Figures

TRACK FOLLOWING SERVOSYSTEM FOR DATA STORAGE APPARATUS

CROSS-REFERENCE TO RELATED APPLICATION

In U.S. Pat. No. 4,072,990, entitled "Servo Positioning System for Data Storage Apparatus," filed July 19, 1976 in behalf of W. J. P. Case et al., data storage apparatus is described and claimed comprising a stack of recording disks mounted for rotation on a drive spindle, a plurality of recording and playback data heads each associated with a corresponding one of a plurality of data surfaces on the disks for performing transducing operations on data tracks thereon, each data track consisting of data sectors for recording and/or playback of data thereon by a data head alternating with servo sectors containing prerecorded data track position information for that track readable by the same data head, a servo head ganged for movement with the data heads and associated with servo tracks prerecorded on a servo surface on one of the disks, the servo tracks being distinct from the servo sectors on the data tracks and providing continuous data track position information readable by the servo head, and servo control circuits operable during track access operations in response to position information signals from the servo surface alone to control movement of the data heads across tracks and operable during track following operations in response to a hybrid signal composed of signals derived from the servo sectors on the data surface including the track being followed and high frequency components of position information signals derived from the servo surface.

BACKGROUND OF THE INVENTION

1. Field of the Invention

This invention relates to data storage apparatus, and in particular, to a track following servosystem useful in disk files.

2. Description of the Prior Art

Although the system described in U.S. Pat. No. 4,072,990 represents a marked improvement over previous systems, it has a disadvantage caused by the cyclic nature and hence the non-linearity of the position information signals, or position error signals (PES), used to control the servo. The problem exists as a result of disturbances which affect the mechanical stability of the apparatus and can lead to the servo head being considerably displaced from its true on-track position over the associated servo track, despite the data head being accurately positioned over the data track being followed.

Under these circumstances, it is possible for the servo head to be so far off track that the position information or position error signals being supplied by the servo head are from the non-linear part of the signal. That is, they do not exhibit a linear relationship with respect to displacement from the servo on-track position. Accordingly, since the high frequency components of this signal are required to form the hybrid servo signal used during track following operations, the gain of the servo circuits at high frequencies varies with changing displacement from the servo on-track position. Since these servo head displacements are caused largely by external disturbances such as temperature variations or shocks and vibrations, as well as internal influencing factors such as eccentricity and tilt of disks on the disk spindle, they are largely uncontrollable. The continuous and unpredictable changing in gain of the servo circuits can lead to loop instability and/or increased head settle time, both of which are undesirable features.

SUMMARY OF THE INVENTION

An object of this invention is to provide an improved track following servosystem. According to the invention, data storage apparatus comprises a stack of recording disks mounted for rotation on a drive spindle; a plurality of recording and playback heads each associated with a corresponding one of a plurality of data surfaces on the disks for performing transducing operations in data tracks thereon; each data track consisting of data sectors for recording and/or playback of data thereon by a data head alternating with servo sectors containing prerecorded data track position information for that track readable by the same data head; a servo head ganged for movement with the data heads associated with servo means providing continuous cyclic data track position information having substantially linear portions, each portion indicating by its magnitude and polarity the degree and direction of offset of the servo head from the end of an increment of movement equal to the distance between successive data tracks; modifying means for receiving said continuous data track position information signals supplied thereto and operable to supply modified position information signals at its output which are substantially linear with respect to displacement from one to another servo track over their entire range; and servo control circuits operable during track access operations in response to position information signals from the servo surface to control movement of the data heads across tracks and operable during track following operations in response to a hybrid signal composed of signals derived from the servo sectors on the data surface, including the track being followed, and high frequency components of modified signals supplied at the output to the modifying means.

BRIEF DESCRIPTION OF THE DRAWINGS

The invention will be described in greater detail with reference to the drawings, in which.

DESCRIPTION OF THE PREFERRED EMBODIMENT

Figure 1:
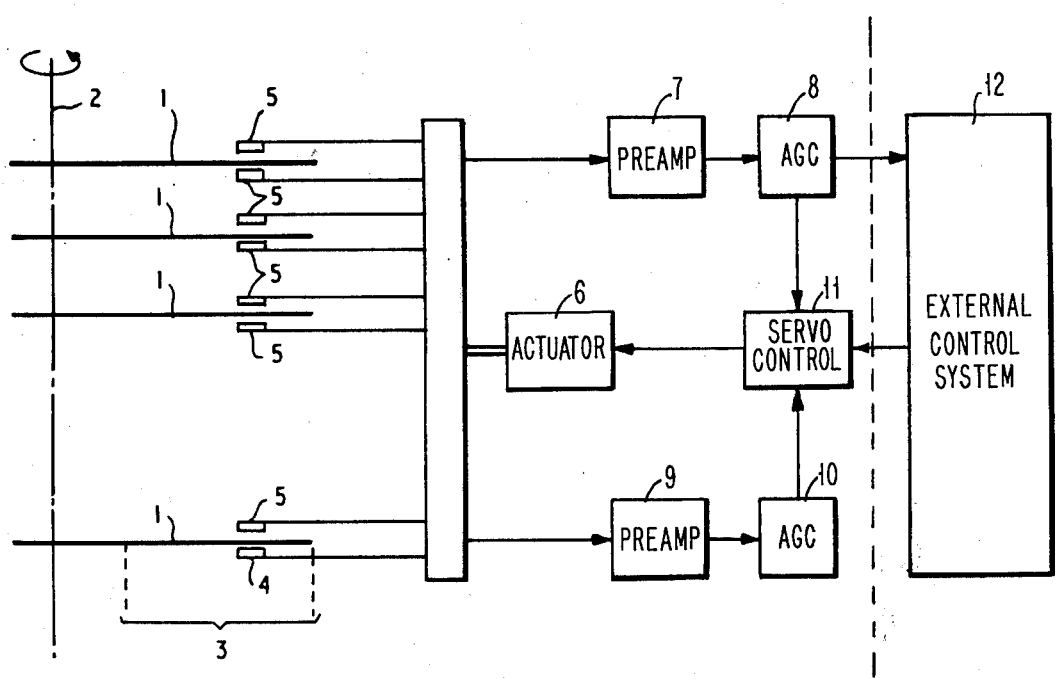
FIG. 1 is a block form diagram of a data storage apparatus, as described and claimed in copending application, Ser. No. 706,313.

In FIG. 1, a stack of magnetic recording disks 1 are mounted for rotation on a central spindle 2. Prerecorded servo tracks 3 are provided over one surface of one of the disks and are read by an associated servo head 4. Since this surface contains only servo information, it is referred to a a dedicated servo surface. The dedicated servo surface contains continuous information regarding the position of data tracks on the remaining surface of the disks which are accessed by a number of data recording the playback heads 5, one being provided for each of the remaining disk surfaces. The data heads 5 and the servo head 4 are all ganged together for movement across the disk surfaces by actuator mechanism 6.

During track access operations, the continuous position error signals derived by the servo head 4 are passed through preamplifier 9 and AGC amplifier 10 to servo control circuit 11 which also receives the address and polarity of the selected data track for each track access operation from an external control system 12. From this information, the servo circuits produce the necessary drive currents for the actuator mechanism 6 to coarsely position the data heads over the desired track.

During track following operations, the fine position error signals required to maintain the data head accurately on track are derived from servo information prerecorded in sectors around the data track itself. Data and servo information read by a selected data head 5 is passed through preamplifier 7 and AGC amplifier 8 to servo control circuit 11. Here the dc and low frequency components of the sectored servo information from the data head is combined in the servo control circuits 11 with high frequency information derived from the dedicated servo surface. The resulting hybrid signal of wide bandwidth is then used to produce suitable drive currents to control the actuator 6 in closed loop mode to hold the data head track following the selected data track. Details of construction and operation of the circuits shown in FIG. 1 are fully described in U.S. Pat. No. 4,072,990.

Figure 2:
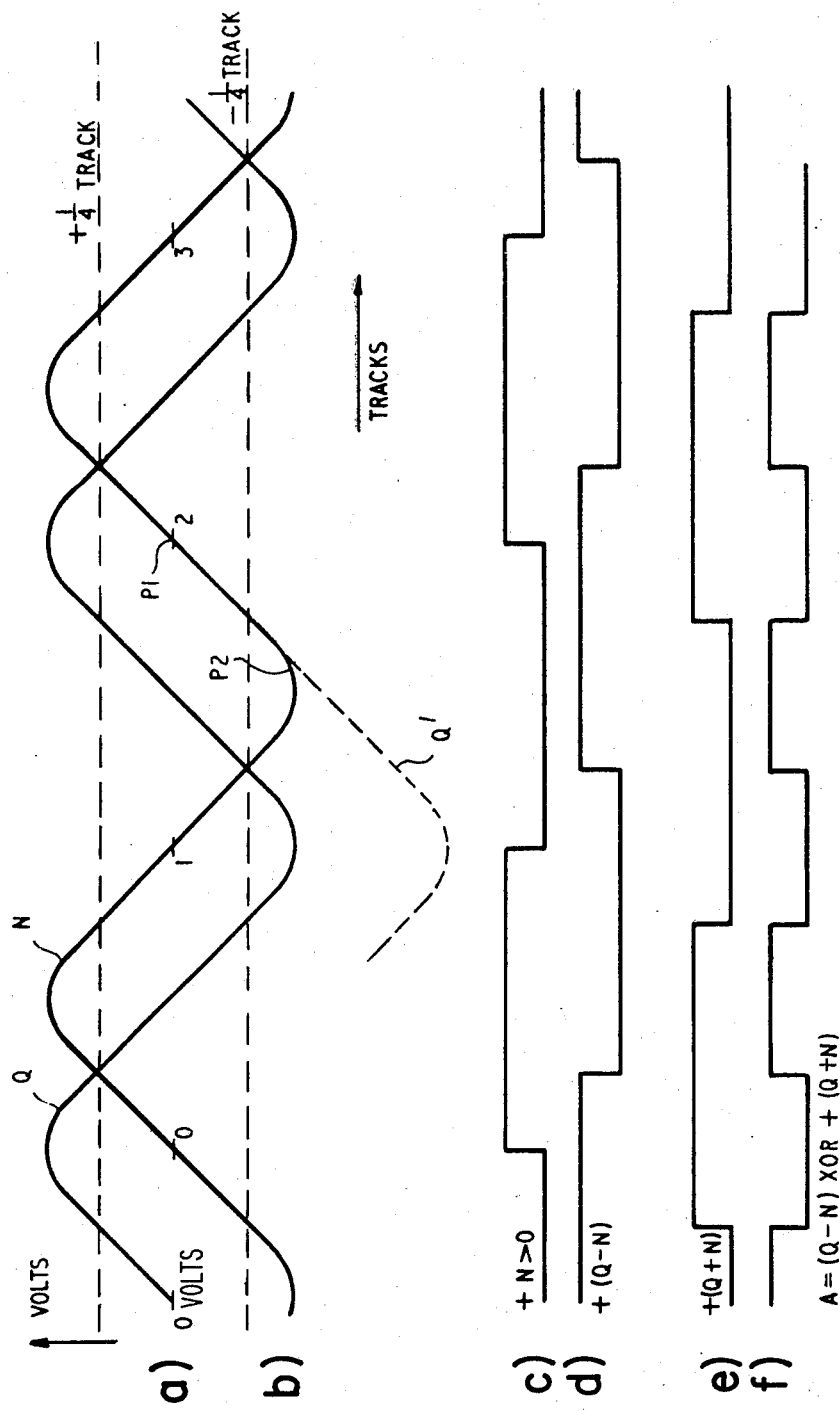
FIGS. 2a-f are normal and quadrature position error signals and logic waveforms derived therefrom.

The position error signals derived by the servo head 4 reading the prerecorded servo information 3 on the dedicated servo surface are illustrated in FIG. 2. Two types of servo tracks recorded on the disk give rise to these two position information signals which are called normal waveform N (FIG. 2b) and quadrature or displaced waveform Q (FIG. 2a). The production of these signals is described in copending application Ser. No. 681,656, entitled "Positioning System for Data Storage Apparatus and Record Medium for Use Therewith,"- filed Apr. 29, 1976, which is referred to in U.S. Pat. No. 4,072,990. As the servo head accesses the disk, the normal quadrature signals change in a cyclic manner passing through the waveform centerline, which may be zero volts, for example, as the servo head crosses the associated normal or quadrature servo tracks on the disk and reaches a maximum voltage midway between tracks. The zero crossings, or on-track positions 0, 1, 2, . . . , of the normal signal (waveform N) are prerecorded to coincide with corresponding data head on-track positions. However, disturbances to the apparatus often upset the mechanical stability and prevent the servo head-on track position from coinciding with the data on-track position.

The nature of the particular servo patterns recorded on the dedicated disk surface is such that the resulting position information signals derived from a single track are substantially linear over a range of $\pm\frac{1}{4}$ of a track width about the on-track position. Such a position is shown, for example, as P1 in FIG. 2b. Thus, provided the displacement of the servo head during data track following operations does not exceed $\pm\frac{1}{4}$ of a track width the voltage generated per unit displacement is constant and the gain of the servo control circuit is also constant at the desired value. If, however, the displacement is such that the servo head becomes offset from its on-track position P1 by more than $\pm\frac{1}{4}$ of a track width, so that during track following operations it lies at position P2, for example, then changes in position error voltage will no longer be linear with respect to changes of position about P2 and the servo position loop performance will be degraded.

This problem is solved in a manner now to be described and involves using the quadrature position error signal not normally used during track following operation to effectively extend the linear region of the normal error signal beyond the $\pm\frac{1}{4}$ track range thereby maintaining the ac gain of the servo circuits constant over the entire displacement range which may occur during track following operations.

The particular servo pattern employed has the advantage that the linear portion of the quadrature waveform Q commences when the linear portion of the normal waveform N ends and vice versa. Thus, by applying a dc offset to the quadrature position error signal with or without inversion of the signal, the linear region of the normal signal can be extended, as shown for example, by the dotted waveform Q' in FIG. 2. Now, with the head displaced to position P2 its position error voltage P2' is still linear with respect to head displacement and the ac gain of the circuit is constant.

The end of the linear region of the normal error signal is readily determined by detecting when the magnitude of the normal error signal N exceeds that of the quadrature error signal Q. When this is the case, the quadrature error signal plus a dc offset is used to effectively extend the linear region of the normal error signal N. The polarity of the required quadrature and offset voltage is determined by the polarity of the normal error signal to be extended and the direction of displacement either left or right from the on-track position. Thus, referring to FIG. 2 which shows position P2 as the on-track position for an even-numbered track 2, the following truth table gives the four possible conditions required to extend the linear region of the normal signal. The required polarity of quadrature and dc offset is given in each case together with the logic levels needed to control switching from normal linear region to extended linear region.

| Track Polarity | Direction Of Displacement | Signal Required | Logic Levels | | |
|---|---|---|---|---|---|
| | | | N>O | Q−N | Q+N |
| | | | N>O | Q−N | Q+N |
| Odd | Left | Q + Offset | 1 | 0 | 1 |
| Odd | Right | −Q − Offset | 0 | 1 | 0 |
| Even | Left | Q − Offset | 0 | 1 | 0 |
| Even | Right | −Q + Offset | 1 | 0 | 1 |

Thus, in the event of a left hand displacement of a head in excess of a quarter of a track from track following an odd-numbered track the signal required to extend the normal linear region is the quadrature signal Q plus a dc offset of appropriate magnitude. Inspection of FIG. 2 shows that the magnitude of the dc offset required is twice the voltage V (FIG. 2) of the quadrature and normal signals when they are of equal magnitude. For a right hand displacement in excess of a quarter of a track from an odd polarity track, the signal required is the inverted quadrature signal, quadrature signal −Q, plus a negative dc offset. Similarly, a left hand displacement from an even-numbered track requires the quadrature signal Q plus a negative dc offset and a right hand displacement requires the inverted quadrature signal −Q plus a positive dc offset.

The logic levels used to indicate head displacements in excess of one quarter of a track in either direction from the on-track positions of odd or even-numbered tracks are identified in the truth table and the waveforms showing the logic levels derived from the position error signals Q and N are shown and identified in FIG. 2c-f. The generation of these logic levels from the position error signals is achieved by conventional comparison circuits.

By exclusively OR-ing the (Q−N) signal with (Q+N) a signal A having up levels corresponding to the nonlinear portions of the normal error signal is produced. Also, the required polarity of the quadrature signal is given by exclusively OR-ing the (N>O) signal with the polarity signal from the control system which is at its up level for track accesses to even-numbered tracks and at its down-level for accesses to odd-numbered tracks. The EVEN signal as it is called is quite conventionally supplied from the control system 12 at the start of an access operation, as previously mentioned.

Figure 3:
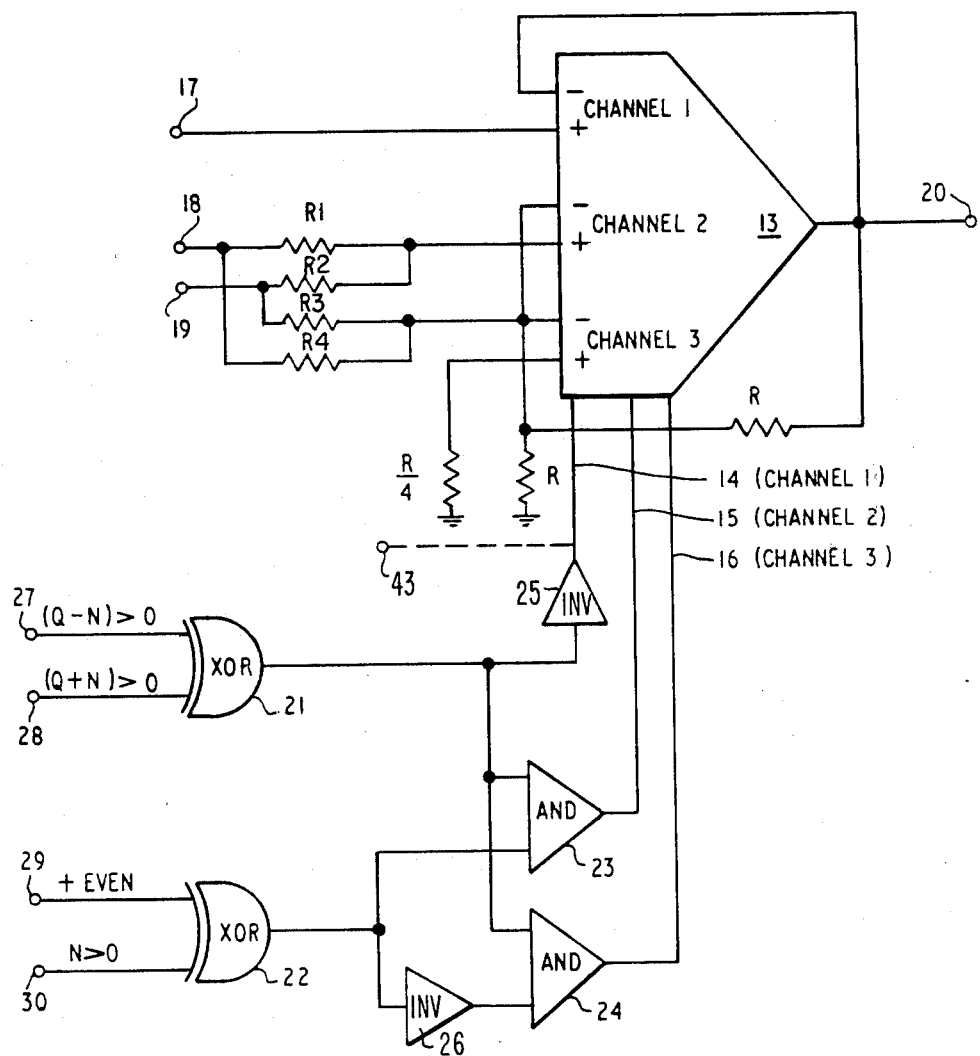
FIG. 3 is a schematic and block diagram of a circuit, according to one embodiment of the invention, for effectively extending the linear region of the normal signal shown in FIG. 2.

A circuit for switching from the normal linear region to extended linear region when displacement in excess of the normal linear region occurs is shown in FIG. 3. The circuit consists of a standard three-channel operational amplifier 13, the appropriate channels being selected by a positive level on one of three corresponding channel select lines 14, 15 and 16. The normal position error signal N is applied to input terminal 17, and thence to the positive input of channel 1 of the amplifier 13. The quadrature position error signal Q is applied at input 18, and then to the positive input of channel 2 through resistor R1 and to the negative input of channel 3 through an identical resistor R2. The offset voltage V, equal to twice the crossover voltage of the quadrature and normal signals, is applied as a positive voltage to input 19 if the track being followed is an odd-numbered track or as a negative voltage of the same magnitude if an even-numbered track is being followed. The polarity of the offset voltage is switched under control of the EVEN signal from the control circuit 12. The offset voltage is added to the signals applied to the positive input of channel 2 and the negative input of channel 3.

During operation, the normal error signal N, supplied to input 17, is transmitted to the output 20 by logic selection of channel 1 during the linear region of the normal signal, that is, during the down-level of signal A (FIG. 2f). At all other times, the quadrature signal supplied to input 18 is transmitted to output 20 with positive or negative dc offset voltage V by logic selection of channel 2, or inverted and transmitted to output 20 again with positive or negative offset voltage V added by logic selection of channel 3.

It will be observed that the polarity of the slope of the signal at 20 is different for ODD and EVEN tracks for motion in a given direction. Accordingly, the signal must be inverted before it can be used to control the driver to track follow over alternate tracks. This is achieved by switching the signal appropriately under control of the EVEN signal.

Logic circuits consisting of exclusive OR gates 21 and 22, AND gates 23 and 24, and inverters 25 and 26 supplied with the appropriate logic signal levels perform the channel selection.

Accordingly, the nonlinear region of the normal signal is provided by applying the (Q−N)>0 signal to input 27 and the (Q+N)>0 to input 28 of exclusive OR 21, the output of which is at an up-level at all times except during the linear region of the normal signal N. This signal, after inversion by inverter 25, is used therefore to select channel 1 during the linear region of the normal signal and to enable AND gates 23 and 24 during the nonlinear regions. Further, the track polarity signal (EVEN) from the control system is applied to input 29 and the signal (N>O) to input 30 of exclusive OR 22 to select the appropriate channel 2 or 3 through AND gates 23 and 24. Thus, for an even-track with a left-hand displacement, (N>0) will be negative and the output from exclusive OR 22 will be at an up-level selecting channel 2 via AND gate 23. The output on line 20 will therefore be the linear region of the quadrature signal with a negative dc offset as shown in the truth table, supra. The other possible conditions can be easily verified with reference to the truth table, and the waveforms shown in FIG. 2.

In order to avoid discontinuities in the extended linear region signal at the point where the quadrature puls offset is switched in, it is necessary that the offset voltage is accurately equal to twice the voltage of the normal and quadrature signals crossover voltage. The offset voltage can of course be produced to any desired accuracy but the magnitude of the crossover voltage is not constant, being subject to change in response to indeterminate circuit tolerances. Thus, the circuit shown in FIG. 3 suffers from the disadvantage that discontinuities can occur during crossover from linear normal to extended linear quadrature. It is therefore necessary to incorporate a feedback loop in the circuit which controls the servo signal gain control so as to normalize the crossover voltage to half the dc offset.

The next embodiment to be described, takes advantage of the ac coupling of the dedicated error signal inherent in the hybrid circuit described in copending application Ser. No. 706,313 to provide a solution to this problem.

Figure 4:
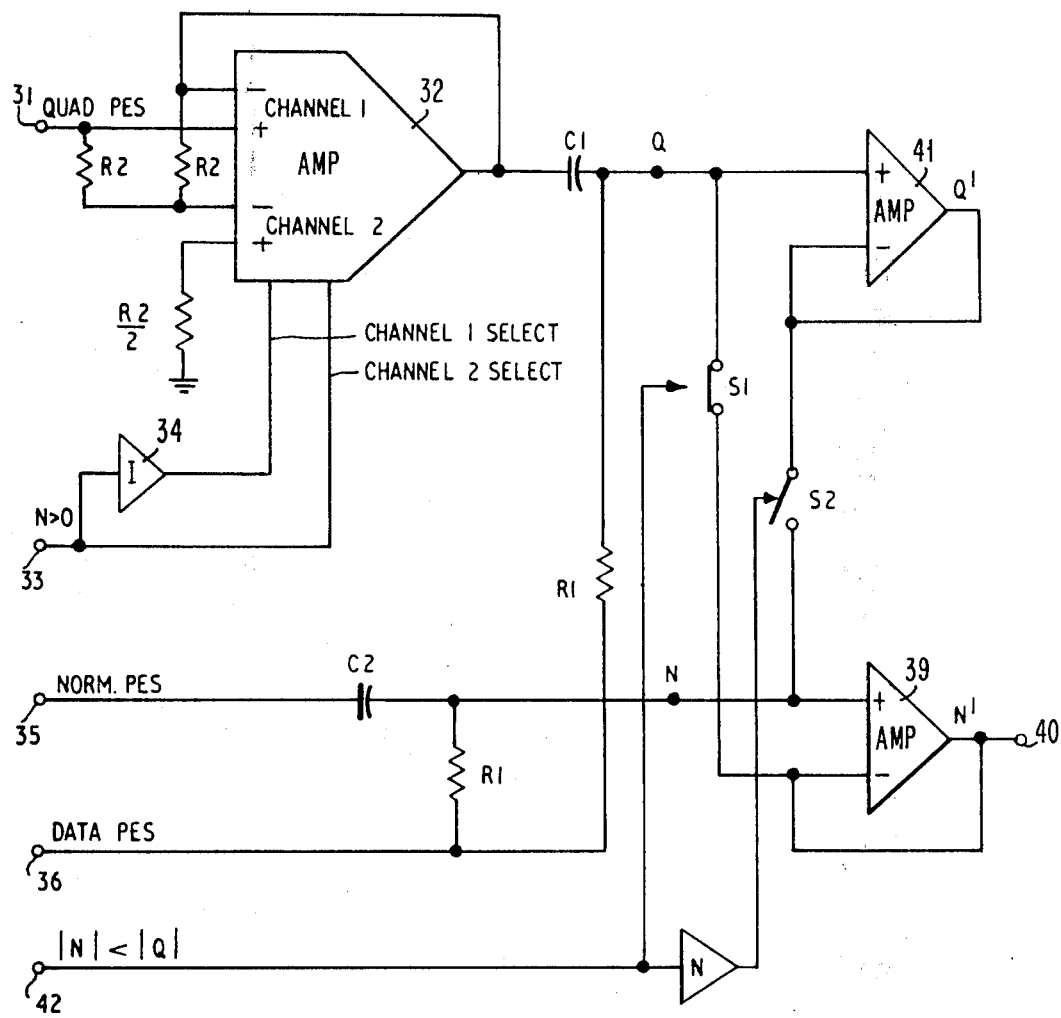
FIG. 4 is a schematic and block diagram of a circuit, according to another embodiment of the invention, for providing the hybrid position error signal required during track following operations, and also for effectively extending the linear region of the normal signal.

FIG. 4 shows a circuit for generating the hybrid servo signal used for track following with the extended linear region feature. The selection of the polarity of the quadrature signal Q applied to terminal 31 is made in this case by a two channel operational amplifier 32 which acts as a switchable inverter. The quadrature signal is passed unchanged through channel 1 selected by the up-level of the (N>0) signal applied to terminal 33 after inversion by inverter 34 and inverted via channel 2 selected directly by the up-level of the (N>0) signal. The normal position error signal N is supplied to input terminal 35 unchanged when the seek is to an EVEN track, but inverted when it is to an ODD track. Inversion may be achieved, for example, by an inverting amplifier switched under control of the EVEN signal. The data head position error signals from the sectored servo information associated with the track being followed are supplied to input terminal 36. Capacitors C1 and resistors R1 connected as shown serve as high pass filters for the quadrature and normal signals from the dedicated surface and as a low pass filter for the sectored servo information from the data surface. A hybrid quadrature position error signal is thereby produced at node Q and a hybrid normal position error signal is produced at node N. To incorporate the extended linear region function, it is necessary to switch between these two signals without introducing a discontinuity. This is achieved by means of the switches S1 and S2. As shown in the Figure, the circuit is shown in the normal linear region mode with S1 closed and S2 open. During this time the hybrid normal signal is supplied directly to the positive input of the amplifier 39 and appears as a version N' on the output line 40. By virtue of the feedback path around amplifier 39, this buffered hybrid position error signal N' appearing during the normal linear region forces the voltage of the Q node which is connected to the negative input of operational amplifier 39 via closed switch S1 to be equal to the voltage of the N node. Now, when the normal position error signal reaches the limit of its linear regions, S1 opens and S2 closes under control of logic signal applied to input 42. Under these circumstances, the hybrid quadrature signal which is applied to the positive input of amplifier 41 appears as a buffered version Q' from its output. By virtue of the feedback path around amplifier 41, the buffered signal Q' now drives the N node which is connected to the negative input of operational amplifier 41 via closed switch S2 to acquire the voltage of the Q node. Since the voltage at Q was previously forced to be equal to the voltage at N, the dc offset of required magnitude is automatically provided with no discontinuity at the changeover point. The extended linear region hybrid error signal now appears at both the N and Q nodes. The logic signal for closing S1 and for opening S2 is the linear region signal (−A) appearing from inverter 25 in FIG. 3 which is applied to input 43. The connection is shown in dotted outline in FIG. 3. The output at 40 has the same polarity of slope at both ODD and EVEN tracks for motion in the same direction and additional switching is not required. Finally, it should be noted that the operation of the circuit shown in FIG. 4 using the two channel amplifier 32 together with the two additional amplifiers 39 and 41 fulfill the conditions set out in the truth table above as well as providing the required frequency mix of the hybrid position error signal.

A problem well known in multiple switching circuits such as that shown in FIG. 4 is an unwanted buildup of the charge on the capacitors as a result of multiple switching and accumulation of small offset error voltages existing in the amplifiers and switches. As will be apparent to those familiar with such circuits, this problem can readily be resolved in a conventional manner by applying hysteresis to the logic comparators which produce the switching signal on line 42 for switches S1 and S2.

In the embodiments described to illustrate the present invention, the continuous position information is derived from servo tracks prerecorded on a dedicated servo surface of the stack of disks. It should be understood that the invention is equally applicable where the data head position information is derived from other means, for example, an optical or inductive transducer cooperating with independent devices containing data track position information.

What is claimed is:

1. A servosystem in a disk drive for accessing selected data tracks on disk surfaces and for following selected data track as the disk surfaces are rotated, one of such disk surfaces being dedicated to servo information, and the other surfaces having data information with servo information sectors in the data tracks, having accessing means including movable magnetic heads coupled to an actuator that is responsive to servo signals comprising:

means for generating a first continuous position signal having high frequency components derived from the dedicated servo disc surface, said continuous position signal including linear and non-linear signal portions;

means for modifying said non-linear signal portions to linear signal portions in response to sensed d.c. voltage levels of previous linear signal portions preceding the non-linear signal portions;

means for generating a second position signal having d.c. and low frequency components derived from data surface servo information;

means for forming a hybrid position signal from said modified and second position signals; and servo control circuit means for controlling the movement of said accessing means relative to the data track being followed in response to said hybrid position signal.

2. Data storage apparatus as in claim 1, in which the continuous data track position information signal read by the servo transducer is represented by a plurality of cyclic electrical signals displaced in phase relative to one another, successive crossings of the centerline of each signal representing successive increments of movement of the servo head along a predetermined path, each signal having a linear portion extending on each side of its centerline crossing which indicates by its magnitude and direction the degree and direction of offset of the servo head from the end of the increment of movement represented by that centerline crossing.

3. Data storage apparatus as in claim 2, in which the number and phase displacement of the cyclic electrical signals are such that said extending linear portions are sequentially generated during a track access operation and taken together represent the entire movement of the data head across the data tracks.

4. Data storage apparatus as in claim 3, in which said modifying means includes means for detecting the end of a selected linear portion of said continuous position information signal and means effective thereafter for selecting the polarity and adjusting the dc level of the immediately adjacent linear portion of a cyclic electrical signal so that it becomes an extension of said selected linear portion.

5. Data storage apparatus as in claim 1, in which the continuous data track position information read by the servo head is represented by a normal cyclic electrical signal and a quadrature cyclic electrical signal displaced in phase 90° from said normal signal, each of such cyclic signals having linear portions.

6. Data storage apparatus as in claim 5, in which said modifying means includes means for detecting the end of a linear portion of a normal cyclic electrical signal and thereafter for selecting the polarity and for adjusting the dc level of the quadrature cyclic electrical signal, so that a linear portion of the quadrature signal becomes an extension of the linear portion of the normal signal.

7. Data storage apparatus as in claim 5, in which the detecting means comprises logic circuits operable in response to voltage levels of said cyclic electrical signals.

8. Data storage apparatus as in claim 6, in which the modifying means includes:

a first circuit for generating a first hybrid signal from signals derived from the servo sectors and high frequency components of normal signals;

a second circuit for generating a second hybrid signal from said signals derived from the servo sectors and high frequency components of quadrature signals;

a first feedback path connected by a first switch during the linear period of the normal signal from the output of the first circuit to the input of the second circuit, so that the input voltage of the second circuit follows the output of the first circuit; and a first storage device connected to the input of the second circuit for storing the voltage thereon;

a second feedback path connected by a second switch during the nonlinear period of the normal signal from the output of the second circuit to the input of the first circuit, so that the input voltage of the first circuit follows the output voltage of the second circuit; and a second storage device connected to the input of the first circuit for storing the voltage thereon, whereby during track following operations, the modified data track position signal is obtained from the output of either the first or the second circuit.

9. Data storage apparatus as in claim 8, in which the modifying means includes logic means for selecting the polarity of the quadrature signal required to form the extension of the linear portion of the normal signal.

* * * * *